United States Patent Office 3,425,971
Patented Feb. 4, 1969

3,425,971
SALT-RESISTANT THICKENERS COMPRISING BASE-SAPONIFIED STARCH-POLYACRYLO-NITRILE GRAFT COPOLYMERS
Lewis A. Gugliemelli, Pekin, and Mary Ollidene Weaver and Charles R. Russell, Peoria, Ill., assignors to the United States of America as represented by the Secretary of Agriculture
No Drawing. Filed Mar. 2, 1966, Ser. No. 531,049
U.S. Cl. 260—17.4
Int. Cl. C08f 3/76
2 Claims

ABSTRACT OF THE DISCLOSURE

Two percent dispersions of saponified starch-polyacrylonitrile graft copolymers provide viscosities of about 6000 cps. even though dispersed in a 12 percent brine. The presence of only a limited sensitivity to high salt concentrations provides the saponified graft copolymers with great potential as a bodying agent for use in secondary oil recovery operations from off-shore wells.

---

A nonexclusive, irrevocable, royalty-free license in the invention herein described, throughout the world for all purposes of the United States Government, with the power to grant sublicenses for such purposes, is hereby granted to the Government of the United States of America.

This invention relates to the base hydrolyzed (saponified) derivatives of certain starch-polyacrylonitrile graft copolymers, even very dilute aqueous solutions or dispersions of which derivatives exhibit amazingly high viscosities and a completely unobvious and apparently species-specific high tolerance and resistance of the viscosities to the ordinarily completely suppressive effect of high concentrations, e.g., about 12 percent, of an inorganic salt such as potassium chloride. This unique combination of viscosities far exceeding those of any natural or synthetic gum plus great resistance to the viscosity-destroying effect of salt, make dilute aqueous solutions or dispersions of our novel saponified derivatives economical and particularly valuable for use as additives for drilling fluids in off-shore secondary oil recovery operations and as thickeners in other applications where unusually high salt concentrations are encountered.

This application relates to a patentably distinct species from those of our copending application S.N. 521,441 filed Jan. 18, 1966, now U.S. Patent No. 3,377,302, in which copending application we teach that dilute aqueous solutions or dispersions of novel high polymers derived by the saponification of starch graft copolymers containing from 1 to 2 parts by weight of grafted polymethylacrylate per part of starch exhibit astonishingly high Brookfield viscosities, e.g., up to about 35,000 cps. at the 1-percent level, which paste viscosities vary with the rate of shear and are thus non-Newtonian. Although the saponified polymethylacrylate starch grafts of our copending application have utility as thickeners or bodying agents in many industrial applications, they do not possess the apparently unique salt tolerance of the instantly described saponified starch polyacrylonitrile graft copolymers.

Although we do not fully understand the reasons for the unobvious salt tolerance, we believe the presence of residual nitrogen that appears to be mainly in the amide form is an important factor.

The principal object of the instant invention is the preparation of more widely useful agriculturally-based bodying agents, salt-containing dilute aqueous solutions or dispersions of which exhibit diminished but still usefully high Brookfield viscosities. Related objects and advantages will appear hereinafter or will be readily apparent to those skilled in the art.

In accordance with the above object, we have now, as in the invention described in the parent application, prepared novel saponified derivatives of ceric-initiated starch-polyacrylonitrile graft copolymers containing either 1 or 2 parts by weight of grafted polyacrylonitrile per weight of starch by subjecting the known graft copolymer to hydrolysis for preferably 2 hours at 80° C. in from 5 ml. to 10 ml. of 10% KOH solution per gram of graft copolymer to yield alkali hydrolyzed derivatives in either the carboxylate form or preferably, after the addition of a slight excess of HCl, essentially in the free acid form, which derivatives are readily dispersible in aqueous media wherein they provide paste viscosities far exceeding those of the known natural gums and synthetic resins, e.g., a 1-percent dispersion of one preparation that was isolated as the free acid and then adjusted to pH 9 with 1% KOH to provide the K-carboxylate form of the product essentially free of extraneous base and salts had a Brookfield viscosity of 47,000 cps. which, when 2% KCl was added, declined to 2200 cps.; with a 2-percent dispersion of the same product, the viscosity still exceeded 6000 cps. after the addition of 12% KCl.

Preparations of the known 1:1 and 1:2 starch-polyacrylonitrile graft copolymer starting materials were performed by first heating 16 g. portions of wheat starch having a 10-percent moisture content in 200 ml. distilled water at 50° C. for 1 hour under nitrogen in a 1-liter, 3-neck, round-bottom flask fitted with a sealed stirrer, a thermometer, and a nitrogen tube, cooling the starch dispersions to 25° C. before adding to each 7 ml. of 0.1 M ceric ammonium nitrate in 1 M $HNO_3$, and then respectively 35 ml. (28 g.) or 50 ml. (40 g.) of freshly distilled acrylonitrile. After 3 hours of reaction at not over 30° C. in the continuing presence of nitrogen, the reacted material was filtered, the insoluble graft copolymers were washed with water to remove unreacted acrylonitrile, extracted with three 200 ml. aliquots of DMF to remove free homopolymer, slurried with water to remove the DMF, and then dried overnight in a current of air. There were obtained, respectively, 31 g. of the 1:1 starch-polyacrylonitrile graft copolymer analyzing C, 55.76%; H, 6.06%; N, 11.72%, and 45 g. of the corresponding 1:2 copolymer analyzing C, 59.26%; H, 5.96%; N, 17.30%. For convenience, the 1:1 starch-polyacrylonitrile graft copolymer starting material will hereinafter be referred to as "Copolymer A" and the predominantly polyacrylonitrile 1:2 copolymer as "Copolymer B."

Molecular weights of the polyacrylonitrile graft side chains in Copolymers A and B were determined from their intrinsic viscosities after degradation and removal of the starch part of the copolymer. The molecular weight values were 680,000 and 795,000 for the polyacrylonitrile chains isolated from respectively Copolymer A and Copolymer B. The number of anhydroglucose units per graft side chain in Copolymers A and B as calculated from the respective polyacrylonitrile contents and the respective side chain molecular weight is 4300 in Copolymer A and 2480 in Copolymer B corresponding to respective D.S. values of 0.00023 and 0.0004.

EXAMPLE 1

Four grams of the granular Copolymer A was reacted with 40 ml. of 10% KOH (10 ml./g.) in a 125 ml. glass stoppered Erlenmeyer flask at 80° C. for 2 hours. A 1-percent aqueous dispersion of the resulting saponified Copolymer A (K carboxylate form) exhibited a Brookfield viscosity of 4800 cps. On further dilution to a concentration of 0.7 percent and the addition to the dispersion of 2 percent of KCl by weight, the viscosity declined to 600 cps. Corresponding values for dispersions of the copolymer hydrolyzed with only half as much KOH, i.e., 5 ml./g., were respectively 10,000 cps. and 140 cps.

while those when the copolymer was hydrolyzed with 25 ml./g. were 1100 cps. and 340 cps. Hydrolysis of Copolymer B with 25 ml. of 10% KOH/g. gave hydrolyzed Copolymer B (K carboxylate form), whose 1% dispersion has a viscosity of 4100 cps. while the 0.7% dispersion in 2% KCl had a viscosity of 1900 cps.

EXAMPLE 2

A 4 g. portion of Copolymer B was hydrolyzed with 40 ml. of 10% KOH as in Example 1. After cooling the reacted material to room temperature, the dispersion was neutralized with 60 ml. of 5 N HCl, and then an additional 5 ml. of the acid was added to adjust to the acid side. Upon the addition of 100 ml. of ethanol to the dispersion, the free acid form of the saponified Copolymer B precipitated. Following several ethanolic reprecipitations from aqueous dispersions and drying with absolute ethanol, 4 g. of the purified free acid form of the hydrolyzed Copolymer B was obtained. For analysis, a portion of the free acid form of the saponified copolymer was exhaustively dialyzed against dilute acetic acid, recovered from the dialyzate by centrifugation, washed with distilled water, and dried. Elemental analysis gave C, 47.16%; H, 6.30%; N, 6.06%; ash, 0.25%. Infrared analysis indicates that most of the N was present in amide form. Based on nitrogen values, the calculated conversion of nitrile groups, by the saponification, to carboxyl groups and amide groups was approximately 60% and 40%, resectively. The dependence of the voscosity on pH and rate of shear is shown in Table 1 wherein the indicated milliliters of 1% KOH have been added to provide pH-adjusted 1% dispersions of the initially free acid form of saponified Copolymer B. The maximum viscosity is provided when the alkali is approximately equivalent to the carboxyl content of the hydrolyzed graft copolymer.

TABLE 1 pH Dependence of Viscosity of 1% Dispersion of initially free acid form of base-hydrolyzed copolymer B (25° C.)

| 1% KOH ml./g. of saponified copolymer B | pH | Spindle No. | Shear, r.p.m. | Viscosity, cps. |
| --- | --- | --- | --- | --- |
| 0 | 5.9 | 4 | 12 | 36,250 |
| 0 | 5.9 | 4 | 6 | 57,000 |
| 8 | 7.1 | 4 | 12 | 44,000 |
| 8 | 7.1 | 4 | 6 | 70,000 |
| 9.2 | 8.9 | 4 | 12 | 47,250 |
| 9.2 | 8.9 | 4 | 6 | 80,000 |
| 12 | 10.5 | 4 | 12 | 40,000 |
| 16 | 11.6 | 4 | 12 | 35,000 |
| 16 | 11.6 | 4 | 6 | 56,000 |
| 32 | 12.4 | 4 | 12 | 23,000 |
| 32 | 12.4 | 4 | 6 | 13,000 |
| 60 | 13.0 | 4 | 30 | 8,000 |

The phenomenal Brookfield viscosities at 25° C. of 0.06 to 1.0% aqueous pastes of the initially free acid form of saponified Copolymer B adjusted to pH 8.9 given below in Table 2.

TABLE 2

| Dispersion, percent | Spindle No. | Shear, r.p.m. | Viscosity, cps. |
| --- | --- | --- | --- |
| 1 | 4 | 30 | |
| 1 | 4 | 12 | 47,250 |
| 1 | 4 | 6 | 80,000 |
| 0.5 | 4 | 30 | 17,300 |
| 0.25 | 4 | 30 | 10,600 |
| 0.125 | 4 | 30 | 4,400 |
| 0.06 | 4 | 30 | 600 |

Table 3 shows the viscosities at pH 11.5 of 1% and 2% dispersions of saponified Copolymer B (K salt, prepared by adjusting the free acid form to pH 11.5) in the presence of various concentrations of KCl.

TABLE 3

Dispersion viscosities of saponified copolymer B at pH 11.5, spindle No .4 and a shear rate of 30 r.p.m.

| Dispersion, percent | KCl conc., percent soln. | Viscosity, cps. |
| --- | --- | --- |
| 1 | 2 | 2,100 |
| 1 | 4 | 1,400 |
| 1 | 6 | 1,000 |
| 2 | 2 | 15,000 |
| 2 | 4 | 11,000 |
| 2 | 6 | 9,800 |
| 2 | 8 | 9,200 |
| 2 | 12 | 6,800 |

Isolation of the hydrolyzed graft copolymer is not essential. For example, a 1-gram portion of graft Copolymer A was hydrolyzed in 5 ml. of 10% KOH for 2 hours at 80° C., and the reaction product was then made up as a 2-percent dispersion also containing 14% KCl. At this unusually high concentration of KCl, the viscosity was 1400 cps.; a corresponding dispersion containing 8% KCl had a viscosity of 1900 cps., and a 1-percent dispersion containing 6% KCl had a viscosity of 1000 cps.

We claim:

1. Bodying agents characterized by the ability of 2 percent dispersions thereof in 12% KCl aqueous systems to provide therein Brookfield viscosities of about 6000 cps., said bodying agents being the potassium carboxylate salt of a starch-polyacrylonitrile graft copolymer starting material containing 1 to 2 parts by weight of grafted polyacrylonitrile per part by weight of starch, said salt having been produced by subjecting said starting material to about 2 hours of saponification at about 80° C. in 5–25 times its weight of 10% KOH.

2. Bodying agents according to claim 1 wherein the starting starch graft copolymer contains 2 parts of polyacrylonitrile per part by weight of starch, the saponification is by 10 ml. of 10% KOH per gram of graft copolymer, and wherein the thereby produced K-carboxylate salt of the saponified graft copolymer is further converted essentially to the free acid form by neutralization with a slight excess of dilute mineral acid.

References Cited

UNITED STATES PATENTS 2,316,128 4/1943 Bock et al. _____ 260—233.3
2,316,129 4/1943 Bock et al. _____ 260—233.3
3,032,498 5/1962 Walker _____ 252—8.5

FOREIGN PATENTS 554,348 2/1957 Belgium.

OTHER REFERENCES

"Polymerization of Acrylonitrile by Ceric Salt in the Presence of Starch," Kimura et al., Makvomol. Chemie 42, 140 (1960).

WILLIAM H. SHORT, Primary Examiner.

E. A. NIELSEN, Assistant Examiner.

U.S. Cl. X.R.

260—29.6